(12) United States Patent
Budin et al.

(10) Patent No.: US 6,484,733 B2
(45) Date of Patent: Nov. 26, 2002

(54) PROCESS FOR REGENERATING USED DENOX OR DEDIOXIN CATALYTIC CONVERTERS

(75) Inventors: Richard Budin, Pfaffstätten (AT); Krzysztof Krotla, Vienna (AT); Hermann Rabitsch, Vienna (AT)

(73) Assignee: Integral Umwelt-und Anlangentechnik Gesellschaft m.b.H, Vienna (AT)

( * ) Notice: Subject to any disclaimer, the term of this patent is extended or adjusted under 35 U.S.C. 154(b) by 57 days.

(21) Appl. No.: 09/792,797

(22) Filed: Feb. 23, 2001

(65) Prior Publication Data

US 2001/0006929 A1 Jul. 5, 2001

Related U.S. Application Data

(63) Continuation of application No. PCT/AT99/00182, filed on Jul. 20, 1999.

(30) Foreign Application Priority Data

Aug. 26, 1998 (AT) .................................... 1453/98

(51) Int. Cl.$^7$ ............................. B08B 7/04; B01J 38/48

(52) U.S. Cl. ..................... 134/22.19; 134/1; 134/22.1; 134/22.16; 134/2; 134/3; 134/28; 502/22

(58) Field of Search ............................... 134/1, 2, 3, 26, 134/28, 30, 22.1, 22.16, 22.19; 502/22, 27, 25, 34

(56) References Cited

U.S. PATENT DOCUMENTS

| 4,992,614 A | * | 2/1991 | Rodewald ...................... 134/1 |
| 5,308,810 A | * | 5/1994 | Voss et al. ................. 423/239.1 |
| 6,241,826 B1 | * | 6/2001 | Dittmer et al. .................. 134/1 |

FOREIGN PATENT DOCUMENTS

| JP | 60-034743 | * | 2/1985 |
| JP | 04-225842 | * | 8/1992 |

* cited by examiner

*Primary Examiner*—Alexander Markoff
(74) *Attorney, Agent, or Firm*—Laurence A. Greenberg; Werner H. Stemer; Ralph E. Locher

(57) ABSTRACT

Used deNOx or dedioxin catalytic converters are regenerated by washing the catalyst with a solution of surface-active substances in a liquid. At the same time, metal compounds are added for creating active centers.

26 Claims, No Drawings

PROCESS FOR REGENERATING USED DENOX OR DEDIOXIN CATALYTIC CONVERTERS

CROSS-REFERENCE TO RELATED APPLICATION

This is a continuation of copending International Application PCT/AT99/00182, filed Jul. 20, 1999, which designated the United States.

BACKGROUND OF THE INVENTION

Field of the Invention

The present invention relates to a process for the regeneration of used deNOx or dedioxin catalysts. Catalysts of this type are used in so-called deNOx or dedioxin installations for reducing and breaking down nitrogen oxides and/or in particular halogenated dioxins and furans in flue gases or other exhaust and off-gases.

The process known as selective catalytic reduction, or SCR for short, is one of the possible options for lowering or even substantially lowering the levels of nitrogen oxides NOx, i.e. a mixture of NO and $NO_2$, formed for example during the combustion of fossil fuels in combustion plants. In the SCR process, the nitrogen oxides are converted into nitrogen and water using ammonia or substances which form ammonia under the system conditions as reducing agent and using a catalyst. Since the catalytic reactions proceed on the surface of the catalyst, a large specific surface area has to be provided through the use of correspondingly porous materials for the reaction. This requirement is met by the use of homogeneous ceramic catalysts, for example in honeycomb form. Most of a catalyst of this nature consists, for example, of the base material titanium dioxide $TiO_2$ in which the active metal compounds, in particular $V_2O_3$, $WO_3$, are homogeneously distributed. However, the catalyst may also be applied as a coating to a support, for example a metal sheet.

Under oxidizing conditions, identical or modified catalysts can also be used to lower the levels of emissions of organic products of incomplete combustion in off-gases from combustion plants, such as for example halogenated dioxins and furans. In this context, reference is had to the disclosure in international publication WO 91/04780.

There are transport processes upstream and downstream of the chemical reactions which take place on the catalyst surface. Following adsorption of the reaction partners on the internal surface of the catalyst, chemical combination between the reaction participants and the catalyst leads to a lowering of the activation energy which is absolutely imperative for the reaction to commence. A consequence is that the reaction is accelerated or the equilibrium is established.

If these active centers are blocked, for example by the accumulation of alkali metals and alkaline earth metals or their compounds which are contained in the fly ash, so that the activated $NH_3$ adsorption required is partially impeded, the activity falls. In addition to this deterioration to the active areas of the catalyst surface through adsorbed catalyst toxins, the pores become blocked, for example, by calcium sulfate ($CaSO_4$) and ammonium hydrogen sulfate ($NH_4HSO_4$) which are formed. Since the catalyst cannot be 100% selective with respect to a specific reaction, the catalyst also promotes some secondary reactions, including the conversion of $SO_2$ to $SO_3$, in an order of magnitude which is relevant. Although this reaction can be minimized by the composition of the catalyst, the fact remains that the small amount of $SO_3$ is sufficient to react with the unreacted $NH_3$, which is referred to as $NH_3$ slippage, and $H_2O$ to form various salts, primarily to form ammonium hydrogen sulfate and ammonium sulfate $(NH_4)_2SO_4$ or to combine with the fly ash.

These compounds form at temperatures at which condensation takes place when the temperature drops below the dew point of ammonium hydrogen sulfate. They may be deposited on the catalyst and in addition, together with adhesive particles, for example ash, fine dust, $SiO_2$, $Al_2O_3$, may block the pores and thus lower the activity of the catalysts.

Therefore, the nature of the composition of the compounds which may be deposited on the catalyst is dependent on the composition of the fly ash, of the flue gas and of the operating temperature. They are generally alkali metal and alkaline earth metal compounds which are contained in the fly ash as oxides and, on account of their reaction with $SO_3$, as sulfates and which are either deposited on the surface together with other compounds contained in the fly ash, such as for example $SiO_2$ and $Al_2O_3$, and block the pores, or, on account of their electron donor properties, block the active centers and thus prevent the activated $NH_3$ adsorption required.

SUMMARY OF THE INVENTION

The object of the present invention is to provide a method of regenerating a deNOx or deDioxin catalytic converter which overcomes the above-noted deficiencies and disadvantages of the prior art devices and methods of this general kind, and which provides for a process by means of which the number of the active centers available for the catalysis is increased as far as possible or as desired, namely, for example, up to the activity of the fresh catalyst or even beyond, in order in this way for the catalytic converter, i.e., the catalyst, to be fully or partially regenerated.

With the above and other objects in view there is provided, in accordance with the invention, a process for regenerating a used deNOx or dedioxin catalytic converters, which comprises washing a catalytic converter with a solution of surface-active substances in a liquid with a simultaneous addition of metal compounds creating active centers.

In other words, the above objects are achieved by the fact that the catalysts are washed with a solution of surface-active substances in a liquid, preferably water, with the simultaneous addition of metal compounds which create active centers.

As a result of this measure, deposited contaminants and chemisorbed compounds and ions are removed, old active centers are made available once more and additional active centers are created. In addition, in this way it is—quite surprisingly—also possible to increase the activity compared to the fresh catalyst. The catalysts which have been treated in this way can be refitted into a deNOx, dedioxin or combined plant with their restored activity.

Washing in, for example, aqueous liquors is a complex operation in which numerous physical and chemical influences interact. This is understood as meaning both the removal of water-soluble deposits by water or by aqueous solutions of active washing substances and the detachment of water-insoluble deposits. In the process, it is possible to prevent redeposition of the insoluble fractions which have already been detached, for example by acoustic irradiation or by stabilizing the dispersed fractions. The water serves as a solvent for washing agents and for soluble compounds and as a transport medium for the dispersed fractions. The washing operation is initiated by the wetting and penetration of the substrate. This can be achieved quickly and completely if the high surface tension of the water is reduced substantially by surfactants as important washing agent components. The physical separation of the deposits from the substrate is based on the nonspecific adsorption of surfactants at various boundary surfaces which are present in the process. Substances with a low solubility are solubilized in molecularly dispersed form by surfactant micelles. The adsorption of washing agent constituents induces changes in the interfacial chemical properties and is consequently a precondition for good detachment.

In accordance with an added feature of the invention, the surface-active substances are selected from anionic or non-ionic surfactants, preferably low-foaming surfactants, and mixtures thereof.

While anionic surfactants and nonionic surfactants are adsorbed nonspecifically at all hydrophobic surfaces, complex formers can be chemisorbed specifically on surfaces with pronounced charge centers. Therefore, complex formers and surfactants augment one another in terms of their specific action at the interfaces. The function of these so-called builders, which in addition to the complex formers, such as sodium triphosphate and other phosphates, also include ion exchangers, such as for example zeolites, consists predominantly in eliminating the alkali metal ions and alkaline earth metal ions derived from the deposits, but also those from the natural water hardness, and in supporting the action of the surfactants. A series of complex formers, for example aminopolycarboxylic acids, such as EDTA or NTA, form stable, water-soluble complexes (chelate complexes) with alkaline earth metals, and in some cases also with alkali metals. The first process is the adsorption of the complex formers at the surface, followed by the desorption of the water-soluble complexes. The removal of cations by means of adsorption/desorption processes and the shift in the solution equilibria are the most important active principles of the complex formers and ion exchangers. Since, when using solid ion exchangers the ion exchange takes place in the heterogeneous phase and therefore there are no adsorption and desorption operations, it may be advantageous to use ion exchangers in combination with water-soluble complex formers which are able to take up ions from solid surfaces and to release them to the ion exchanger after transport by the aqueous medium. The water-soluble complex formers serve as carriers. Weaker complex formers, such as for example citrate, tartrate, oxalate, gluconate or lactate, may also be used.

The action of the surface-active substances can be intensified by further additions, such as for example complex-forming substances or ion exchangers, and also by washing at temperatures which are higher than ambient temperature. The application of active metal compounds can be reinforced by rinsing with or application of liquids which contain these compounds. If appropriate, rinsing with or application of liquids takes place a number of times, with drying steps in between.

The washing of the catalysts is preferably carried out in liquors produced using water, in particular using water of low hardness, i.e. <10° dH, in which active washing substances, e.g. anionic or nonionic surfactants, above all low-foam surfactants or mixtures of the two compounds, and metal compounds, such as for example vanadium compounds, tungsten compounds or molybdenum compounds, are contained; complex-forming substances may be added in all said washing processes. The washing may also be carried out with the addition of ion exchangers. Additions of, for example, dilute acids, such as inorganic and organic acids or mixtures thereof, or of lyes, if appropriate with oxidizing or reducing additives, or of organic solvents may be expedient depending on the specific type of deactivation of the catalyst. Following application to the catalyst surface, the metal compounds should be able to be converted into their oxide form under the action of heat during a drying operation or after installation in the deNOx or dedioxin plant, without residues which have an adverse effect on the catalyst activity being produced. For this reason, metal compounds which are free from alkali metals, alkaline earth metals, halogens and sulfur are preferred.

Since most alkali metal compounds are water-soluble, they can be removed by washing with water. Since most pore-blocking compounds which adhere to the catalyst surface are also water-soluble, the water-insoluble compounds, such as $SiO_2$ or $Al_2O_3$, could penetrate still further into the pores as a result of the removal of the water-soluble compounds which initially surround them. To prevent this, the catalysts may be washed under acoustic irradiation, in which case the frequency range may extend from the infrasound range to the ultrasound range (<20 Hz to >20 kHz). The acoustic irradiation may take place with constant or pulsed amplitude, for example in an ultrasound bath, with the result that these insoluble compounds are ejected from the pores of the catalyst.

In the case of washing in a liquid bath, the physical-chemical active principles described may be assisted, for example, by the hydrodynamics and, in addition, by a flow which is generated by means of a liquid-circulation device or by pulsed gas bubbles. Moreover, it is possible, for example, for suspended particles to be made to float by applying extremely fine gas bubbles (flotation).

Furthermore, a mechanical abrasion of the outermost layer may be carried out prior to the washing, in order to remove the compounds which are coarsely adhering to the catalyst surface, such as for example dust, $K_2SO_4$ or $Na_2SO_4$, by suction, blowing, sandblasting, brushing or the like.

After the washing, the catalytic converters are preferably dried. On the one hand, fitting regenerated catalysts which are still wet into a deNOx or dedioxin plant can make it easy for dust or fly ash from the flue gas to stick to the catalysts, thus immediately leading to partial deactivation again. On the other hand, the residual quantity of liquid contained in the fine cavities in the catalyst on account of capillary forces is relatively difficult to remove. After the installation of the regenerated catalysts in a deNOx or dedioxin plant, the first flow of hot flue gas through the catalyst could lead to sudden evaporation, resulting in damage to the catalyst caused by cracks and therefore to negative mechanical properties which cause a reduced service life of the catalyst. For this reason, gentle drying must be carried out, for example by passing through hot air at temperatures of, for example, 60 to 120° C. In addition, further fixing of the metal compounds which have been applied takes place.

We claim:

1. A process for regenerating a used deNOx or dedioxin catalytic converter, which comprises washing a catalytic converter with a solution containing surface-active substances in a liquid and metal compounds creating active centers.

2. The process according to claim 1, wherein the surface-active substances are selected from the group consisting of anionic surfactants, nonionic surfactants, and mixtures thereof.

3. The process according to claim 1, which comprises using low-foaming surfactants as the surface-active substances.

4. The process according to claim 1, wherein the metal compounds are selected from the group consisting of vanadium compounds, tungsten compounds, molybdenum compounds, and mixtures thereof.

5. The process according to claim 1, wherein the metal compounds are essentially free of alkali metals, alkaline earth metals, halogens, and sulfur.

6. The process according to claim 1, wherein the liquid is water.

7. The process according to claim 6, wherein the water has a hardness of less than 10° dH.

8. The process according to claim 1, wherein the solution further comprises one of acids and lyes.

9. The process according to claim 1, wherein the solution further comprises one of complex-forming substances and ion exchangers.

10. The process according to claim 1, wherein the solution further comprises oxidizing or reducing additives.

11. The process according to claim 1, wherein the solution further comprises organic solvents.

12. The process according to claim 1, wherein the washing step is carried out with additional action of acoustic irradiation.

13. The process according to claim 12, which comprises setting a frequency of the acoustic irradiation in the ultrasound range.

14. The process according to claim 1, wherein the washing step comprises washing in a bath and moving the solution.

15. The process according to claim 14, wherein the moving step comprises agitating the solution with a liquid-circulating device or by generating gas bubbles.

16. The process according to claim 1, which comprises, after the washing step, rinsing the catalytic converter with liquids containing metal compounds creating active centers.

17. The process according to claim 16, wherein the rinsing step is carried out a plurality of times, with drying steps in between.

18. The process according to claim 16, wherein the metal compounds are selected from the group consisting of vanadium compounds, tungsten compounds, molybdenum compounds, and mixtures thereof.

19. The process according to claim 16, wherein the metal compounds are essentially free of alkali metals, alkaline earth metals, halogens, and sulfur.

20. The process according to claim 1, which comprises, after the washing step, applying to the catalytic converter liquids containing metal compounds creating active centers.

21. The process according to claim 20, wherein the applying step is carried out a plurality of times, with drying steps in between.

22. The process according to claim 20, wherein the metal compounds are selected from the group consisting of vanadium compounds, tungsten compounds, molybdenum compounds, and mixtures thereof.

23. The process according to claim 20, wherein the metal compounds are essentially free of alkali metals, alkaline earth metals, halogens, and sulfur.

24. The process according to claim 1, wherein the washing step is carried out at a temperature of more than 30° C.

25. The process according to claim 1, which comprises drying the catalytic converter subsequently to the washing step.

26. The process according to claim 25, wherein the drying step comprises blowing heated air through the catalytic converter.

* * * * *